(12) United States Patent
Bell, Jr. et al.

(10) Patent No.: US 8,091,073 B2
(45) Date of Patent: Jan. 3, 2012

(54) SCALING INSTRUCTION INTERVALS TO IDENTIFY COLLECTION POINTS FOR REPRESENTATIVE INSTRUCTION TRACES

(75) Inventors: Robert H. Bell, Jr., Austin, TX (US);
Wen-Tzer T. Chen, Austin, TX (US);
Richard J. Eickemeyer, Rochester, MN (US); Venkat R. Indukuru, Austin, TX (US); Pattabi M. Seshadri, Austin, TX (US); Madhavi G. Valluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/758,031

(22) Filed: Jun. 5, 2007

(65) Prior Publication Data
US 2008/0307203 A1  Dec. 11, 2008

(51) Int. Cl.
*G06F 9/44* (2006.01)
(52) U.S. Cl. ................................... 717/128; 717/126
(58) Field of Classification Search .............. None
See application file for complete search history.

(56) References Cited

U.S. PATENT DOCUMENTS
2004/0111708 A1* 6/2004 Calder et al. ................ 717/131
2006/0143206 A1* 6/2006 Lock et al. ................... 707/101

OTHER PUBLICATIONS

Muralimanohar, Naveen; Ramani, Karthik; Balasubramonian, Rajeev. "Power Efficient Resource Scaling in Partitioned Architectures through Dynamic Heterogeneity." Copyright 2006.*
Wunderlich, Roland; Wenisch, Thomas; Falsafi, Babak; Hoe, James. "SMARTS: Accerlating Microarchitecture Simulation via Rigorous Statistical Sampling." Copyright 2003.*
Hamerly, Greg; Perelman, Erez; Lau, Jeremey; Calder, Brad. "SimPoint 3.0: Faster and More Flexible Program Phase Analysis." Published Sep. 2005.*
Hamerly, Greg; Perelman, Erez, Calder, Brad. "How to Use SimPoint to Pick Simulation Points." Published 2004.*
Bebenita, Michael; Chang, Mason; Wagner, Gregor; Gal, Andreas; Wimmer, Christian; Franz, Michael. "Trace-Based Compilation in Exection Environements without Interpreters." Copyright 2010.*
Srinivasan, Ram; Cook, Jeanine; Cooper, Shaun. "Faxt, Accurate Microarchitecture Simulation Using Statistical Phase Detection." IEEE 2005.*
Sherwood et al., "Automatically Characterizing Large Scale Program Behavior", Proceedings of the 10th International Conference on Architectural Support for Programming Languages and Operating Systems (ASPLOS X), Oct. 2002, 13 pages.
Wunderlich et al., "SMARTS: Accelerating Microarchitecture Simulation via Rigorous Statistical Sampling", Proceedings of the 30$^{th}$ Annual International Symposium on Computer Architecture (ISCA), 2003, 12 pages.

* cited by examiner

*Primary Examiner* — Wei Zhen
*Assistant Examiner* — Adam R Banes
(74) *Attorney, Agent, or Firm* — Stephen J. Walder, Jr.; Diane R. Gerhardt (57) ABSTRACT

A method, system, and computer program product are provided for identifying instructions to obtain representative traces. A phase instruction budget is calculated for each phase in a set of phases. The phase instruction budget is based on a weight associated with each phase and a global instruction budget. A starting index and an ending index are identified for instructions within a set of intervals in each phase in order to meet the phase instruction budget for that phase, thereby forming a set of interval indices. A determination is made as to whether the instructions within the set of interval indices meet the global instruction budget. Responsive to the global instruction budget being met, the set of interval indices are output as collection points for the representative traces.

20 Claims, 6 Drawing Sheets

| WEIGHTS FILE | |
|---|---|
| PHASE | WEIGHT |
| 302 | 20% |
| 304 | 20% |
| 306 | 30% |
| 308 | 10% |
| 310 | 20% |

| LABELS FILE | |
|---|---|
| PHASE | INTERVAL ORDER |
| 302 | 314, 312 |
| 304 | 316, 318 |
| 306 | 322, 324, 320 |
| 308 | 326 |
| 310 | 328, 330 |

| SIMPOINTS FILE | |
|---|---|
| PHASE | INTERVAL |
| 302 | 314 |
| 304 | 316 |
| 306 | 322 |
| 308 | 326 |
| 310 | 328 |

| SPLITS FILE | |
|---|---|
| DATASET | INSTRUCTIONS |
| 410 | 0 MILLION |
| 412 | 10 MILLION |
| 414 | 40 MILLION |
| 416 | 70 MILLION |

SCALING INSTRUCTION INTERVALS TO IDENTIFY COLLECTION POINTS FOR REPRESENTATIVE INSTRUCTION TRACES

BACKGROUND

1. Technical Field

The present application relates generally to instruction tracing. More specifically, the present application is directed to scaling instruction intervals from phases of the traces in order to identify collection points for representative instruction traces.

2. Description of Related Art

Modern software workloads may have dynamic instruction path lengths that consist of trillions of instructions for a single dataset. For example, the program 464.h264ref, which is a computer program that is a reference implementation of the latest state-of-the-art video compression standard, which is H.264/AVC (Advanced Video Coding), when executed to completion on a processor that is using a single dataset, may have more than 3.2 trillion dynamic instructions.

Trace-driven performance simulators are used to assess design changes and project workload performance for future processors. These simulators may execute on the order of ten thousand instructions per second on modern machines. Thus, for a program with one trillion dynamic instructions, simulation could take on the order of 3.1 years to complete. However, prior work has shown that the dynamic instructions in a workload often exhibit phases of execution, i.e. repetitive sequences of instructions that correlate strongly to the basic blocks being executed by a program. By creating a representative trace from only the prominent program phases, the number of instructions that must be simulated is significantly reduced.

Some known systems use coarse-grained phases or fine-grained instruction blocks obtained using statistical analysis techniques to find a small number of instructions that represent, in proportion, the machine execution characteristics of a much larger number of instructions from the dynamic execution of a program. The output of these known systems is a set of begin and end instruction index pairs that indicate the portions, such as phases or instruction blocks, of the program execution or program trace that best represent the execution of the program. In many cases the phases are all the same length and overall performance is obtained by multiplying the performance results for each phase by the frequency of appearance of the phase in the full program execution. Additionally, the phases may not be obtained from all input datasets for simultaneous execution on a simulator.

However, these known systems fail to address the use of a specific number of instructions to represent a program, the inclusion of phases from each input dataset, inclusion of all datasets at once, and all of these such that all program phases for all datasets are accurately represented in a trace, as may be important for efficient and accurate trace-driven program execution in a simulator system.

SUMMARY

The illustrative embodiments provide for the collection of a small set of representative instructions from the dynamic execution of a program and all its input datasets. A program execution trace is broken into intervals of instructions, which are then selected, ordered, and scaled based on the weights assigned to each of the intervals and an instruction budget. The intervals are chosen to represent the workload within the instruction budget. In some cases the chosen instructions may be assessed for representativeness using hardware performance monitor counters, which may require that the scaled instructions from each of the selected intervals be rounded. However, rounding of the scaled instructions may lead to errors, such as overall instruction deficits or overages relative to the instruction budget. These errors are corrected by adjusting the number of instructions in one or more intervals. Additionally, warm-up instructions may also be included based on the chosen intervals. Warm-up instructions are additional instructions that may be needed in order to warm-up the locality structures of the processor, such as the caches and branch predictor. Representative traces of the instructions, including warm-up instructions if desired, are then collected and used by a simulator to simulate the execution of the program.

The illustrative embodiments provide for identifying instructions to obtain representative traces. The illustrative embodiments calculate a phase instruction budget for each phase in a set of phases. The phase instruction budget may be based on a weight associated with each phase and a global instruction budget. The illustrative embodiments identify a starting index and an ending index for instructions within a set of intervals in each phase in order to meet the phase instruction budget for that phase forming a set of interval indices. The illustrative embodiments determine if the instructions within the set of interval indices meet the global instruction budget. The illustrative embodiments output the set of interval indices as collection points for the representative traces in response to the global instruction budget being met.

The illustrative embodiments determine if a set of warm-up instructions are to be included with the instructions in the global instruction budget and, responsive to the indication that warm-up instructions are to be included, the illustrative embodiments adjust the starting index by a predetermined number of instructions or to the end of the prior interval in the set of intervals.

In identifying the starting index and the ending index for instructions within the set of intervals in each phase, one illustrative embodiment determines if a number of instructions in a most representative interval within the set of intervals are equal to the phase instruction budget. This illustrative embodiment identifies a beginning of the most representative interval as the starting index and an end of the most representative interval as the ending index, in response to the instructions within the most representative interval being equal to the phase instruction budget.

In identifying the starting index and the ending index for instructions within the set of intervals in each phase, another illustrative embodiment determines if a number of instructions in a most representative interval within the set of intervals are more than the phase instruction budget. This illustrative embodiment identifies a beginning of the most representative interval as the starting index and scaling the most representative interval to a point where the number of instructions equals the phase instruction budget, wherein the point is the ending index, in response to the instructions within the most representative interval being more than the phase instruction budget.

In identifying the starting index and the ending index for instructions within the set of intervals in each phase, still another illustrative embodiment determines if a number of instructions in more than one most representative interval within the set of intervals are equal to the phase instruction budget. This illustrative embodiment identifies a beginning of the more than one most representative intervals as the starting index and an end of the more than one most representative intervals as the ending index, in response to the instructions within the more than one most representative intervals being equal to the phase instruction budget.

In identifying the starting index and the ending index for instructions within the set of intervals in each phase, a further illustrative embodiment determines if a number of instructions in more than one most representative intervals within the set of intervals are more than the phase instruction budget. This illustrative embodiment identifies a beginning of the more than one most representative intervals as the starting index and scaling the more than one most representative intervals to a point where the number of instructions equals the phase instruction budget where the point is the ending index, in response to the instructions within the more than one most representative intervals being more than the phase instruction budget.

The illustrative embodiments determine if the sum of the instructions within the set of interval indices is less than the global instruction budget in response to the global instruction budget failing to be met, and increase the instructions within one interval of one phase in the set of phases in order to meet the instruction budget, in response to the sum of the instructions within the set of interval indices being less than the global instruction budget.

The illustrative embodiments determine if the sum of the instructions within the set of interval indices is less than the global instruction budget in response to the global instruction budget failing to be met, and decrease the instructions within one interval of one phase in the set of phases in order to meet the instruction budget, in response to the sum of the instructions within the set of interval indices being more than the global instruction budget.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Modern software simulations may require that representative traces satisfy certain criteria, such as 1) a single trace must represent all input datasets for the program or workload, 2) the trace must be long enough to represent all phases of execution for the input datasets, and 3) the trace, including warm-up instructions, must execute in performance simulators in a reasonable amount of time to allow fast turnaround of performance design studies and predictions. The amount of time is generally within a day or two, which means a trace must be a specific length in terms of instructions over all phases. In addition, the trace for any program may be the same number of instructions as for any other program, so that comparisons of rates of execution when executed together through the performance simulator are reasonable; i.e., if one trace finishes long before another, the final performance rate results may not be representative of similar programs executing in combination on a real processor, or the like.

Figure 1:
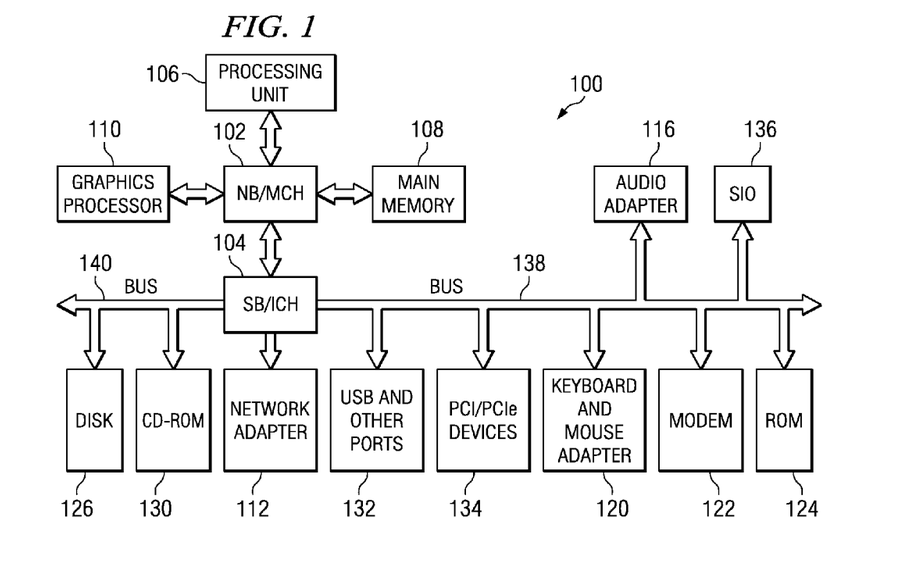
FIG. 1 is a block diagram of an exemplary data processing system in which aspects of the illustrative embodiments may be implemented.

With the illustrative embodiments, a data processing system provides a method to obtain representative traces that satisfy such criteria. FIG. 1 is provided as an exemplary data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1.

As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

The illustrative embodiments use beginning and ending instruction indices and apportion the beginning and ending indices to meet a specific instruction budget, or a certain number of instructions, that runs in a certain amount of time on a simulator and can be used effectively in a specific simulation environment, such as the linear instruction simulation environment. In a linear instruction simulation environment instructions must be simulated one after another in a specific order regardless of the phase relationships among the instructions.

Figure 2:
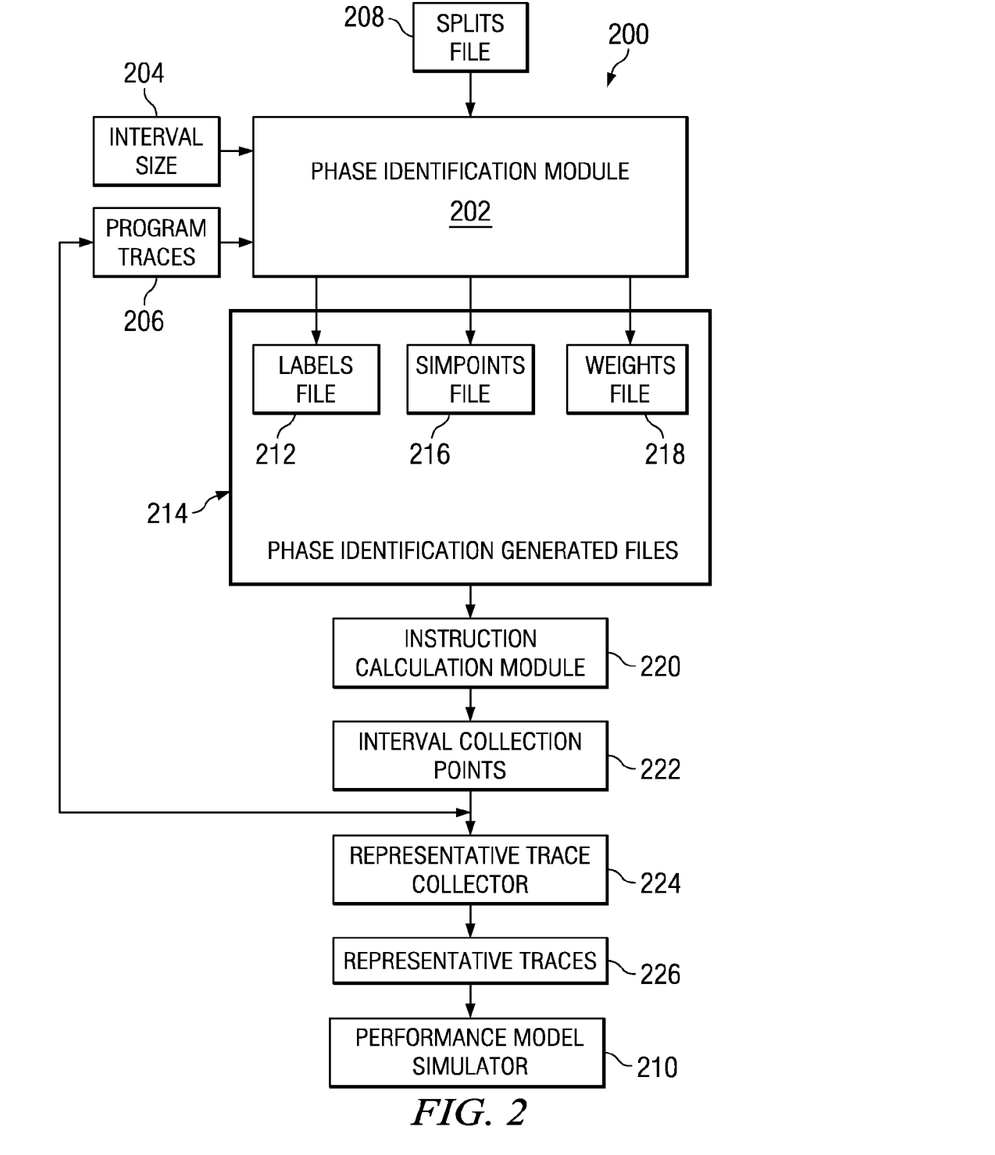
FIG. 2 depicts a functional block diagram of an instruction scaling system that identifies collection points for representative traces in accordance with an illustrative embodiment.

FIG. 2 depicts a functional block diagram of an instruction scaling system that identifies collection points for representative traces in accordance with an illustrative embodiment. Instruction scaling system 200 includes phase identification module 202 that receives interval size 204, a plurality of program traces 206, one for each dataset, as input, concatenated into a single trace, and splits file 208. A dataset is a set of data that is used in the execution of the program. The illustrative embodiments may use one dataset or a number of datasets. Each of program traces 206 is a full trace of the executed instructions of a program. Phase identification module 202 divides program traces 206 into samples or intervals of instructions of a size equal to interval size 204. Interval size 204 may be provided from a user and passed into phase identification module 202. Interval size 204 may have a predefined size, for example, typical interval sizes are 10 million to 100 million instructions. Interval size 204 should be smaller than an instruction budget required for efficient turnaround time of results from simulation on performance model simulator 210. The turnaround time is preferably one day or some other desired time period and depends on the detail in the performance model and the speed of performance model simulator 210. The number of intervals required in program traces 206 for accurate program simulation may vary. However, simulation experiments have shown that usually 5 to 15 intervals, or about 10 intervals on average, are needed to represent a full program execution for many programs. Therefore, 10 intervals times 10 million instructions per interval provide a total instruction budget of 100 million instructions, for example.

Splits file 208 is generated from program traces 206. Splits file 208 specifies the cumulative number of instructions in program traces 206 in the order of how the dataset traces are concatenated together. For example, for a first dataset that produces 10 million instructions, a second dataset that produces 30 million instructions, and a third dataset that produces 20 million instructions, splits file 208 would indicate that for the first dataset the instructions start at 0 million, for the second dataset the instructions start at 10 million, and for the third dataset the instructions start at 40 million. If a fourth dataset were included, splits file 208 would indicate that the instructions for the fourth dataset start at 60 million without regard to the size of the fourth dataset. As described, program traces 206 are concatenated for phase identification using phase identification module 202. Splits file 208 may be used later to separate the identified phases into collection points that are relative to the first instruction in each of program traces 206, since the representative traces will be executed in a program simulator individually.

Phase identification module 202 performs phase detection on program traces 206 using a clustering algorithm in software, such as the well-known K-means algorithm, which finds similarities between the intervals of program traces 206 and groups the intervals into separate phase lists, one for each phase of the programs, which are then listed in labels file 212. Labels file 212 lists the intervals in each phase ordered from top to bottom with respect to how well each interval represents the phase as determined by the clustering algorithm. The interval at the top of each phase in labels file 212 is said to be the most representative interval of the phase and the interval at the bottom of each phase in labels file 212 is said to be the least representative interval of the phase. Phase identification module 202 generates labels file 212 along with other phase identification generated files 214. Phase identification generated files 214 may also include simulation points (simpoints) file 216, and weights file 218.

Simpoints file 216 specifies the interval at the top of the phase in labels file 212 and is therefore the most representative interval of the group of intervals that represents the phase. Simpoints file 216 specifies the interval in terms of the interval's starting dynamic instruction number divided by the interval size 204. Weights file 218 specifies the weight for each phase, which is the proportion of instructions from full program execution that can be attributed to the phase. For example, if the sum of all of the instructions in program traces 206 equals 150 million instructions and one particular phase has 60 million instructions, then the weight of that particular phase is 40 percent. The weighted sum of the performance can be obtained for all the phases and represents the performance of the execution of program traces 206.

Instruction calculation module 220 processes phase identification generated files 214 in the following described manner. For every phase indicated by simpoints file 216, instruction calculation module 220 uses the weight corresponding to that phase from weights file 218 to calculate how many instructions from each of the phases are needed based on the given instruction budget. Instruction calculation module 220 identifies an interval instruction starting index and an interval instruction ending index for each phase starting with the most representative interval. It is possible that the number of instructions for each phase may be less than the interval size, some multiple of the interval size, or a multiple of the interval size and some fraction of an interval more.

If the number of instructions is less than the instructions in an entire interval, instruction calculation module 220 scales the top element on the ordered phase list from labels file 212 to have a number of instructions equal to the weight times the instruction budget, rounded to some number of instructions, such as one million instructions. For example, assuming the instruction budget is 100 million instructions and the weight for a phase is 7.1%, then 0.071 times 100 million instructions gives 7.1 million instructions that are then rounded to 7 million instructions, which is less than the 10 million instruction interval size. Instruction calculation module 220 rounds the instructions to a predetermined whole unit, as an example, because the performance of the chosen intervals may be verified using hardware performance monitor data on a one million instruction boundary, or by some other means.

Rounding of instructions may introduce errors that must be addressed in order to exactly meet the instruction budget. If the necessary number of instructions to meet the instruction budget is a multiple of the number in more than one interval, for example, N intervals, then instruction calculation module 220 uses the ordered phase lists of labels file 212 to select the top N most representative intervals for the phase. It is important to note that two or more of the intervals may or may not be contiguous among the dynamic instructions of the workload.

If the necessary number of instructions is greater than one interval in length but not an even multiple of the interval size, then instruction calculation module 220 scales the last interval picked from the phase list in labels file 212 to fulfill the requirement to meet the weight, which again may be rounded to the nearest one million instructions, or the like. For example, if the weight is 23.4%, then 21.4 million instructions are required, which requires the top two intervals from the phase list, and three million instructions from the third. Again, the last interval is rounded to 3 million instructions in this example if the predetermined whole unit is a million.

Because of the rounding errors, the overall number of instructions must be adjusted to meet a global instruction budget. The adjustment of instructions may require the use of additional intervals from the phase list in labels file 212 or scaling of an interval already chosen. In an exemplary implementation, instruction calculation module 220 adjusts the number of instructions in the last chosen interval of the last processed phase.

If the rounding causes the overall number of instructions to be less than the global instruction budget, then instruction calculation module 220 increases the last interval by the necessary amount of instructions. If the last interval already contains an interval size of instructions, instruction calculation module 220 chooses the next in order interval from the same phase of the phase list in labels file 212, scales the interval, and adds the interval to the list. If the phase does not have another interval, a prior phase is chosen and more instructions are taken from one or more intervals in that phase in order starting from the last chosen interval in that phase. Since the global instruction budget is usually much smaller than the full execution trace, and since the entire trace is divided completely into intervals that must be assigned to phases, finding the extra instructions in some phase is usually possible.

If the rounding causes the overall number of instructions to be greater than the global instruction budget, then an interval(s) in the last processed phase is affected. Instruction calculation module 220 reduces the last processed interval in the phase to meet the budget. If there are not enough instructions in the last processed interval, then prior interval(s) are selected to be scaled back, for example, one or more intervals dropped and another possibly scaled back to meet the budget, starting at the last chosen interval and proceeding in backwards through the chosen intervals in their phase list order. In addition, if still not enough instructions have been dropped, prior phases may be reduced in the same way. However, the rounding error is usually small and only one interval of one phase is affected.

Two pathological cases exist: 1) If the global instruction budget is more than the number of instructions in program traces 206, no solution exists, representative tracing is limited to a budget less than or equal to the number of instructions in the full execution trace, and 2) If the global instruction budget is equal to the number of instructions in program traces 206, then the process will converge and use all intervals from all phases of the trace, in which case the global instruction budget will be satisfied and the weights will be satisfied. Neither case results in a representative trace that speeds up simulation time and is usually not desired.

To generate representative workloads, empirical evidence suggests that additional instructions are needed in order to warm-up the locality structures of the processor, such as the caches and branch predictor. To do this, additional instructions, which may be provided from a user as input to instruction scaling system 200, will need to be collected in front of each of the intervals that have been chosen by instruction calculation module 220 to represent the workload. Once instruction calculation module 220 chooses the representative intervals as described above, instruction calculation module 220 specifies that interval collection is to begin some predetermined number of instructions, for example, M instructions, prior to the starting instruction of each interval. As an example, it may be necessary that M be equal to 10 million warm-up instructions per interval. If the interval is contiguous with the prior chosen interval in the representative instruction trace, no warm-up instructions are specified because the prior interval warms-up the locality structures. If there are more than zero but less than M instructions between the interval and the end of a previous chosen interval, then the difference in instructions is specified as an additional number of warm-up instructions.

Instruction calculation module 220 then outputs a set of interval collection points 222 that may be used to construct the representative trace. Interval collection points 222 are specified in terms of the instruction number at the starting point of the first warm-up instruction for each interval and the total number of instructions to collect, including the warm-up instructions and the interval itself. Each interval may be a full interval size or scaled down to represent the weight of the phase. Two or more of interval collection points 222 may be joined into one if the warm-up instructions and/or intervals are contiguous. Interval collection points 222 are ordered with respect to their starting instructions over the program executing all datasets together in some sequence or for each dataset separately. If the trace is collected for one dataset at a time, interval collection points 222 must be specified such that the instructions numbers are relative to the dynamic instruction numbers when running just that dataset. Splits file 208 is used to determine the beginning instruction for a particular dataset over all datasets. Using interval collection points 222, representative trace collector 224 collects representative traces 226 of instructions from program traces 206. Performance model simulator 210 uses representative traces 226 to model the performance of a processor design.

By using the above process, a small set of representative instructions are collected from the dynamic execution of a plurality of programs and all their datasets. The full execution traces are broken into intervals of instructions, which are ordered, selected, and scaled based on the weights assigned to the intervals to represent the workload within an instruction budget. Rounding errors that lead to overall instruction deficits or overages are corrected by adjusting the instructions in one or more intervals. Warm-up instructions are specified based on the chosen intervals. Through this process, the instruction budget plus warm-up instructions are obtained which 1) represents all datasets for a program, 2) is long enough to be representative of the program execution using a required instruction budget, 3) executes in a reasonable amount of time based the instruction budget, and 4) creates traces for all workloads that are equal to the instruction budget plus warm-up instructions.

Figure 3:
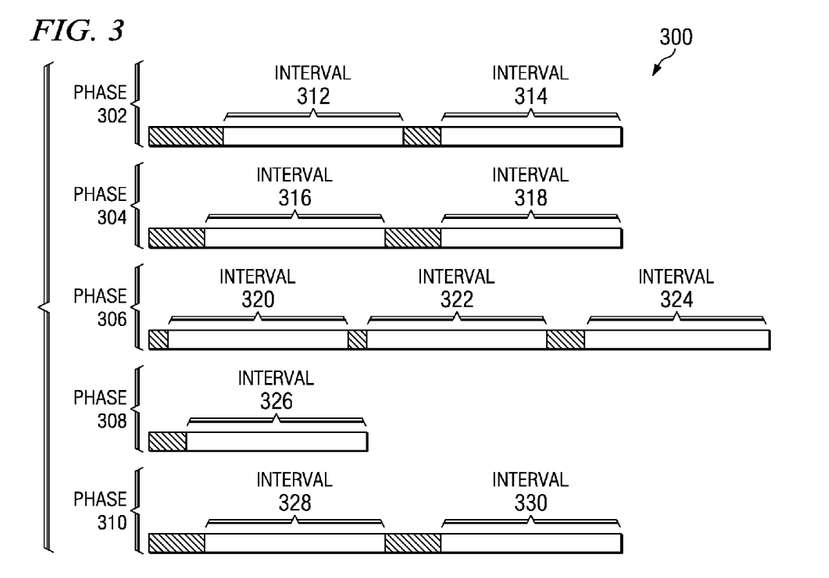
FIG. 3 depicts exemplary phase lists in a labels file generated by a phase identification module in accordance with an illustrative embodiment.

FIG. 3 depicts exemplary phase lists in a labels file generated by a phase identification module in accordance with an illustrative embodiment. Phase list 300 may be generated by a phase identification module, such as phase identification module 202 of FIG. 2. The phase identification module uses a software clustering algorithm to find similarities between the intervals of a program trace and groups the intervals into separate phase lists, one for each phase of the program. Phase list 300 illustrates five exemplary phases, phases 302-310. Each of phases 302-310 includes a number of intervals of instructions of a size equal to the predefined interval size. The predefined interval size in this example is 10 million instructions. In phases 302-310 there are ten total intervals although not all of phases 302-310 include the same number of intervals.

The ten exemplary intervals in phase list 300 are an example amount of intervals needed to represent a full program execution. In this example, phase 302 includes intervals 312 and 314, phase 304 includes intervals 316 and 318, phase 306 includes intervals 320, 322, and 324, phase 308 includes interval 326, and phase 310 includes intervals 328 and 330.

Phase list 300 is ordered with respect to how well each interval represents each phase based on a software clustering algorithm. The phase identification module generates phase list 300 and uses phase list 300 to generate a simpoints file, a weights file, a labels file, and a splits file.

Figure 4A:
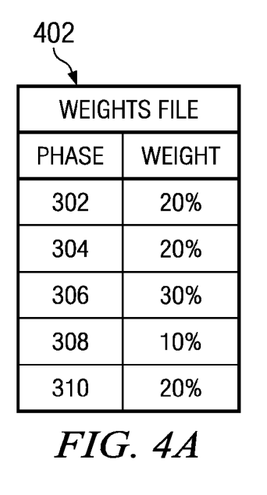
FIGS. 4A-4D illustrate an exemplary simpoints file, weights file, labels file with ordered phase lists, and splits file in accordance with an illustrative embodiment.

FIGS. 4A-4D illustrate an exemplary simpoints file, weights file, labels file with ordered phase lists, and splits file, respectively, in accordance with an illustrative embodiment. The simpoints file, weights file, and labels file may be generated by a phase identification module, such as phase identification module 202 of FIG. 2. The splits file is generated from the instructions in each of concatenated program traces 206 of FIG. 2. FIG. 4A depicts weights file 402, which is representative of weights file 218 of FIG. 2. Weights file 402 specifies the weight for each of phases 302-310 in FIG. 3, which is the proportion of instructions from full program execution that can be attributed to each of phases 302-310. The weighted sum of the performance obtained for all the phases represents the full program execution. In weights file 402, phase 302 has a weight of 20%, phase 304 has a weight of 20%, phase 306 has a weight of 30%, phase 308 has a weight of 10%, and phase 310 has a weight of 20%. An instruction calculation module uses weights file 402 to calculate how many instructions from each of phases 302-310 are needed based on the given instruction budget. As discussed above, it is possible that the number of instructions for each phase may be less than the interval size, some multiple of the interval size, or more than one interval size but some fraction of an interval more.

Figure 4B:
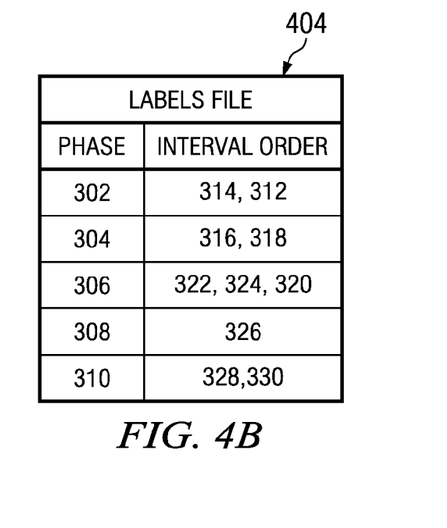

FIG. 4B depicts labels file 404, which is representative of labels file 212 of FIG. 2. Labels file 404 lists the intervals, in order of representativeness, that are assigned to each of phases 302-310 in FIG. 3. In labels file 404, phase 302 includes two intervals with interval 314 being the most representative and 312 being the least representative as specified for phase 302 in the phase list of labels file 212 of FIG. 2, phase 304 includes two intervals with interval 316 being the most representative and 318 being the least representative, phase 306 includes three intervals with interval 322 being the most representative, interval 324 being the next most representative, and 320 being the least representative, phase 308 includes only interval 326, and phase 310 includes two intervals with interval 328 being the most representative and 330 being the least representative.

Figure 4C:
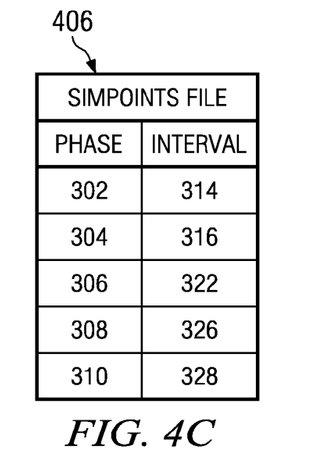

FIG. 4C depicts simpoints file 406, which is representative of simpoints file 216 of FIG. 2. Simpoints file 406 specifies one interval per phase that is the most representative interval of the group of intervals that represents the phase. Simpoints file 406 specifies the interval in terms of the interval's starting dynamic instruction number divided by the interval size. For example, interval 314 in the simpoints file 406 indicates that the first dynamic instruction is at 3.14 billion, if the interval size is 10 million. In simpoints file 406, for phase 302 the interval specified as 314 is the most representative interval, for phase 304 interval 316 is the most representative interval, for phase 306 interval 322 is the most representative interval, for phase 308 interval 326 is the most representative interval, and for phase 310 interval 328 is the most representative interval.

Figure 4D:
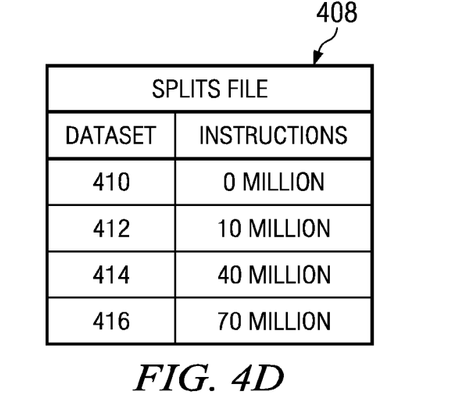

FIG. 4D depicts splits file 408, which is representative of splits file 208 of FIG. 2. Splits file 408 specifies the starting points of the dynamic instructions associated with each dataset in concatenated program traces 206 of FIG. 2. Splits file 408 is provided because each dataset to the program is executed separately to collect the representative program trace. In splits file 408, execution on dataset 410 begins after instruction 0 in the concatenated program traces, dataset 412 begins at 10 million instructions in the concatenated program traces, dataset 414 begins at 40 million instructions in the concatenated program traces, and dataset 416 begins at 70 million instructions in the concatenated program traces.

Normally the representative traces are collected for one dataset at a time, so the interval collection points are specified such that the instructions numbers are relative to the dynamic instructions for just that dataset. So splits file 408 is used to determine the beginning instruction for a particular dataset over all datasets. Using interval collection points 222 in FIG. 2 and the beginning instruction for the particular dataset from splits file 408, representative trace collector 224 in FIG. 2 can then collect representative traces of instructions from a program trace for that dataset.

By using the lists and files illustrated in FIGS. 3 and 4A-4D, a small set of representative instructions are collected from the dynamic execution of a program and all its datasets. The full execution trace is broken into intervals of instructions, which are ordered, selected, and scaled based on the weights assigned to the intervals to represent the workload within an instruction budget.

Figure 5:
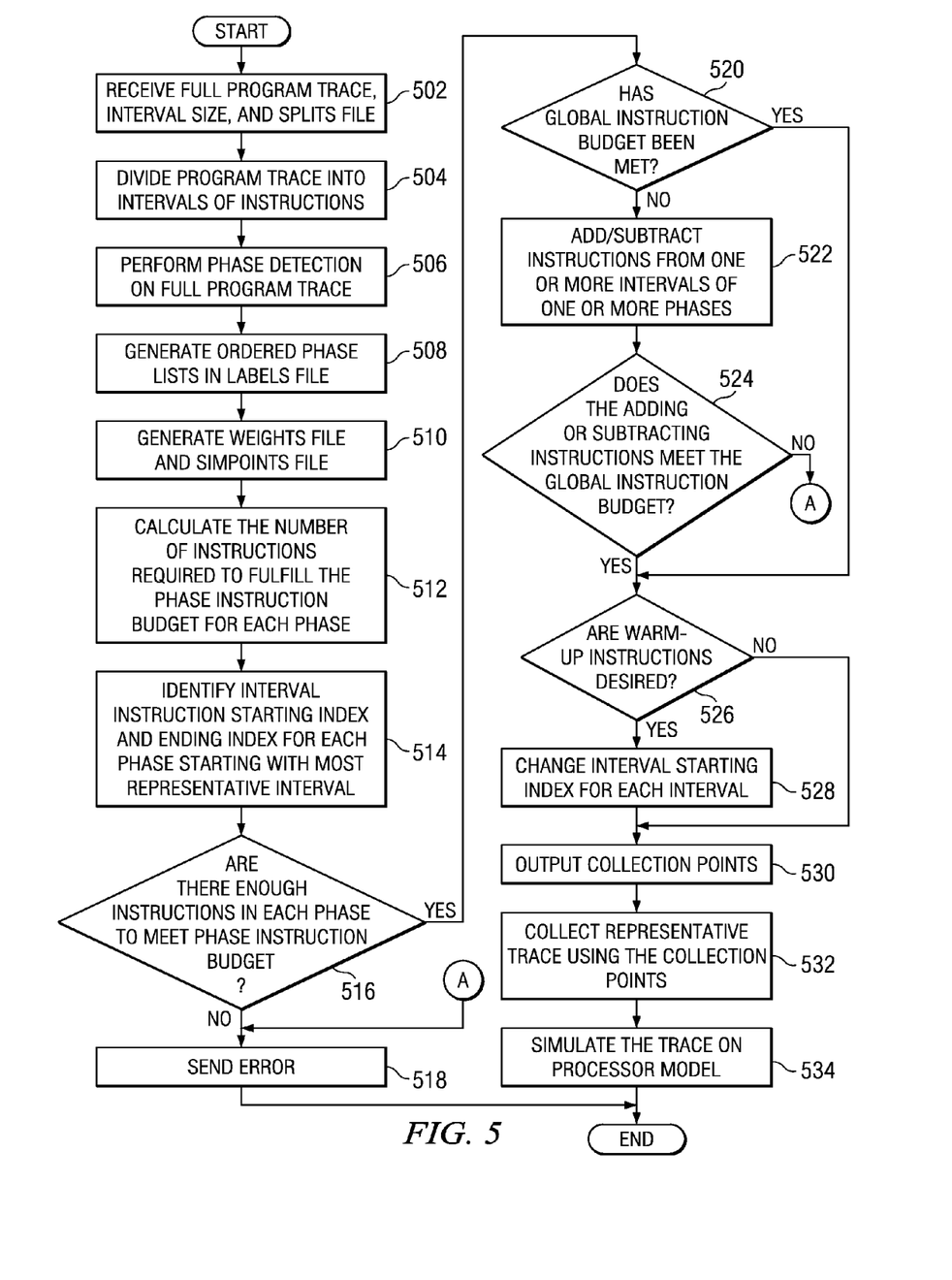
FIG. 5 depicts a flowchart of the operation performed in scaling instruction intervals to identify collection points for representative instruction traces in accordance with an illustrative embodiment.

FIG. 5 depicts a flowchart of the operation performed in scaling instruction intervals to identify collection points for representative instruction traces in accordance with an illustrative embodiment. As the operation begins, an instruction scaling system, such as instruction scaling system 200 of FIG. 2, receives a program trace created from the concatenation of a plurality of full program traces, an interval size, and a splits file (step 502). The splits file specifies how many instructions there are for each dataset that was used to generate the original trace. A phase identification module, such as phase identification module 202 of FIG. 2, divides the program trace into intervals of instructions of a size equal to the received interval size (step 504). The phase identification module performs phase detection on the full program trace to find similarities between the intervals of the program trace (step 506). The phase identification module uses a software algorithm, such as the K-means clustering algorithm, to generate ordered phase lists in the labels file which groups the intervals into separate phases, one for each phase of the program trace (step 508). Each phase list in the labels file is ordered with respect to how well each interval represents the phase using a metric, such as Euclidian distance as in the K-means algorithm.

The phase identification module also generates a simulation points (simpoints) file and a weights file (step 510). The simpoints file specifies one interval per phase, which is the interval that is the most representative interval of the group of intervals that represents the phase. The weights file specifies the weight for each phase, which is the proportion of instructions from full program execution that can be attributed to the phase.

An instruction calculation module, such as instruction calculation module 220 of FIG. 2, calculates for every phase in the simpoints file how many instructions from each of the phases are needed based on the given instruction budget using the weight corresponding to that phase in the weights file (step 512). The instruction calculation module identifies an interval instruction starting index and an interval instruction ending index for each phase starting with the most representative interval in the phase list (step 514). Since it is possible that the number of instructions for each phase may be less than the interval size, some multiple of the interval size, or more than one interval size but some fraction of an interval more, the instruction calculation module determines if there are enough instructions in the phase list of each phase to meet the instruction budget for each phase (step 516). Since the individual phase instruction budgets are determined based on the weights file generated by the phase identification module applied to the overall instruction budget, if one or more of the individual phase instruction budgets are not met at step 516, the instruction calculation module sends an error to an administrator (step 518), with the operation ending thereafter. The event that an error is sent is unlikely given that the instruction budget is usually dramatically smaller than the number of instructions in a modern program trace.

If at step 516, all of the individual phase instruction budgets are met, then the instruction calculation module determines whether all of the individual instruction budgets together meet the global instruction budget (step 520). If at step 520 the global instruction budget is not met, then the instruction calculation module adds or subtracts instructions by changing the interval instruction starting index from one or more of the intervals of one or more of the phases in one of the manners described above until the total number of instructions matches the global instruction budget (step 522). The instruction calculation module then determines if the global instruction may be met by the adding or subtracting of instructions (step 524). If at step 524, the global instruction budget may not be met, then the instruction calculation module sends an error to an administrator (step 518), with the operation ending thereafter. Adding or subtracting instructions to meet the global instruction budget may change the individual phase instruction budgets, but this is usually a small effect depending on the granularity of the rounding function in the budget calculations.

If at step 520 the global instruction budget is met or if at step 524 the adding or subtracting of instruction meets the global instruction budget, then the instruction calculation module determines whether warm-up instructions are desired (step 526). If at step 526 warm-up instructions are desired, then the instruction calculation module changes the interval instruction starting index to begin some number of instructions M, prior to the starting instruction of each interval (step 528) with the operation continuing to step 530. As described above, if the interval is contiguous with the prior interval in the dynamic instruction trace, no warm-up instructions are specified because the prior interval warms up the locality structures. If there are more than zero but less than M instructions between the interval and the end of a previous interval, then the difference in instructions is specified as the number of warm-up instructions.

From steps 526 or 528, the instruction calculation module outputs a set of interval collection points that, together with the splits file used to separate out the instructions per dataset, may be used to construct the representative trace (step 530). The interval collection points are specified in terms of an interval instruction starting index and an interval instruction ending index. Using the interval collection points, a representative trace collector collects representative traces of instructions from the program traces for each dataset (step 532). A performance model simulator uses the representative traces to model the performance of a processor design (step 534), with the operation ending thereafter.

Figure 6A:
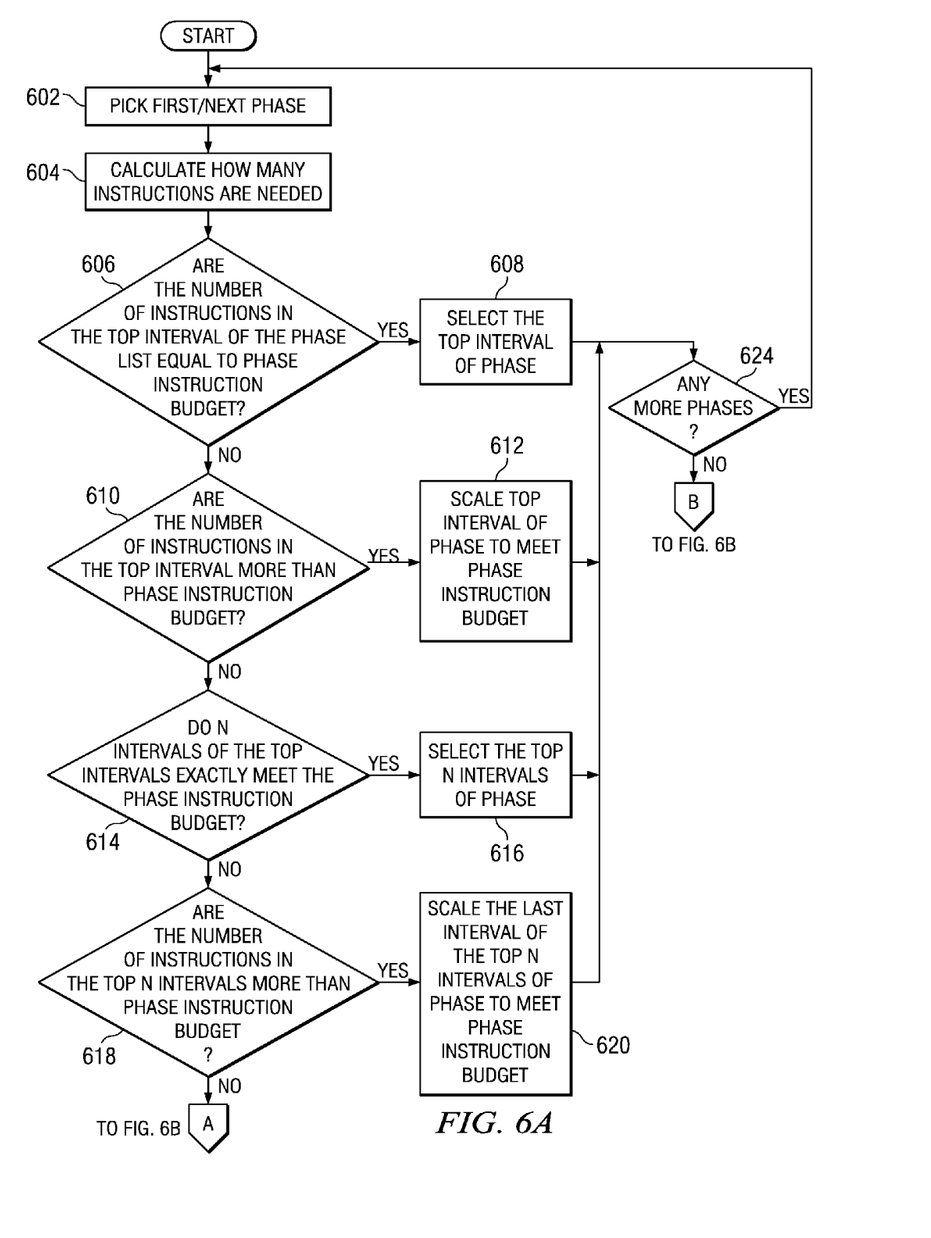
FIGS. 6A and 6B depict a flowchart of the operation performed in calculating the number of instructions to meet phase instruction budgets and a global instruction budget in accordance with an illustrative embodiment.
Figure 6B:
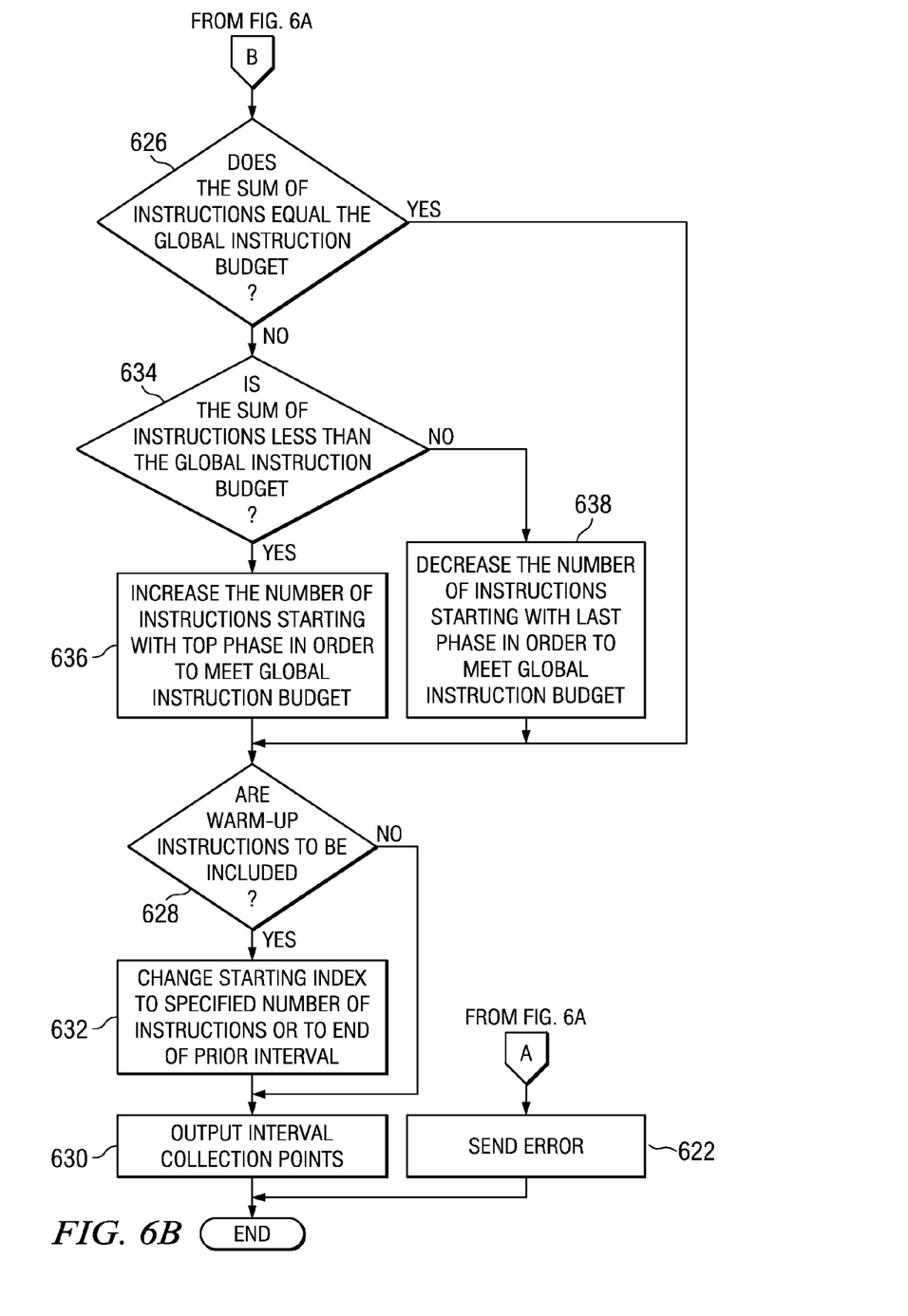

FIGS. 6A and 6B depict a flowchart of the operation performed in calculating the number of instructions to meet phase instruction budgets and a global instruction budget in accordance with an illustrative embodiment. The following operations are performed by an instruction calculation module, such as instruction calculation module 220 of FIG. 2. As the operation begins an instruction calculation module picks the first phase and/or the next phase for instruction calculation (step 602). For the phase indicated by a simpoints file, the instruction calculation module uses the weight corresponding to the phase in the weights file to calculate how many phase instructions are needed based on the given global instruction budget, producing a phase instruction budget (step 604). The instruction calculation module determines if the number of instructions in the top (most representative) interval of the phase list is equal to the phase instruction budget (step 606).

If at step 606 the number of instructions in the top interval is equal to the phase instruction budget, then the instruction calculation module selects the top interval of the phase (step 608). If at step 606 the number of instructions in the top interval is not equal to the phase instruction budget, the instruction calculation module determines if the number of instructions in the top interval is more than the phase instruction budget (step 610). If at step 610 the number of instructions in the top interval is more than the phase instruction budget, then the instruction calculation module scales the top interval of the phase to meet the phase instruction budget (step 612). If at step 610 the number of instructions in the top interval is less than the phase instruction budget, then the instruction calculation module determines if a number of intervals N of the top intervals in the phase as determined by its phase list in the labels file exactly meet the phase instruction budget (step 614).

If at step 614 the number of intervals N of the top intervals exactly meet the phase instruction budget, then the instruction calculation module selects the top N intervals of the phase (step 616). If at step 614 the number of intervals N of the top intervals does not exactly meet the phase instruction budget, then the instruction calculation module determines if the number of instructions in the top N intervals as determined by the interval order in the labels file is more than the phase instruction budget (step 618). If at step 618 the number of instructions in the top N intervals is more than the phase instruction budget, then the instruction calculation module scales the top N intervals in the phase list to meet the phase instruction budget (step 620). If at step 618 the number of instructions in the top N intervals is less than the phase instruction budget, then the instruction calculation module sends an error to the administrator (step 622), with the operation ending thereafter. The error is sent to indicate that using all of the intervals in the phase still fails to meet the phase instruction budget.

Once the phase instruction budget has been met in one of steps 608, 612, 616, or 620, the instruction calculation determines if there are any more phases to calculate instructions for (step 624). If at step 624 there are more phases for which to calculate instructions, the operation returns to step 602. If at step 624 there are no more phases to calculate instructions for, the instruction calculation module determines if the sum of all of the phase instructions budgets is equal to the global instruction budget (step 626). If at step 626 the sum of all of the phase instructions budgets is equal to the global instruction budget, then the instruction calculation module determines if warm-up instructions are to be included (step 628). If at step 628 warm-up instructions are not to be included, the instruction calculation module outputs the interval collection points to a representative trace collector (step 630), with the operation ending thereafter. If at step 628 warm-up instructions are to be included, then the instruction calculation module changes the starting index of the interval by a specified number of instructions or to the end of the prior interval (step 632) with the operation continuing to step 630 thereafter.

Returning to step 626, if the sum of all of the phase instructions budgets is not equal to the global instruction budget, then the instruction calculation module determines if the sum of all of the phase instructions budgets is less than the global instruction budget (step 634). If at step 634 the sum of all of the phase instructions budgets is less than the global instruction budget, then the instruction calculation module increases the number of instructions starting with the last processed phase and moving to other intervals in the phase or other phases as described above in order to meet the global instruction budget (step 636), with the operation continuing to step 628 thereafter. If at step 634 the sum of all of the phase instructions budgets is more than the global instruction budget, the instruction calculation module decreases the number of instructions starting with the last or least representative phase in order to meet the global instruction budget (step 638), with the operation continuing to step 628 thereafter.

The set of interval collection points output by the instruction calculation module are then used by the representative trace collector in combination with the splits file to collect representative traces of instructions from the program trace. A performance model simulator uses the representative traces to model the performance of a processor design.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one hardware implemented processor, for identifying instructions, in a plurality of instructions, to be used to obtain representative traces of the execution of the plurality of instructions, the method comprising:

calculating, by the data processing system, a phase instruction budget for each phase in a set of phases of the plurality of instructions, each phase comprising a subset of instructions from the plurality of instructions, wherein:

the phase instruction budget is based on a weight associated with each phase and a global instruction budget, the global instruction budget specifies a maximum number of instructions to be used to trace execution of the plurality of instructions, and the phase instruction budget for an associated phase specifies a maximum number of instructions to be used to trace execution of a subset of instructions associated with the associated phase, and the weight associated with each phase is a proportion of instructions from full program execution that are attributed to the phase;

identifying, by the data processing system, a starting index and an ending index for instructions within a set of intervals in each phase in order to meet the phase instruction budget for that phase, thereby forming a set of interval indices;

determining, by the data processing system, if the instructions within the set of interval indices meet the global instruction budget; and responsive to the global instruction budget being met, outputting, by the data processing system, the set of interval indices as collection points for the representative traces.

2. The method of claim 1, further comprising:
determining if a set of warm-up instructions are to be included with the instructions in the global instruction budget; and
responsive to the indication that warm-up instructions are to be included, adjusting one of the starting index, or end of a prior interval in the set of intervals, by a predetermined number of instructions.

3. The method of claim 1, wherein identifying the starting index and the ending index for instructions within the set of intervals in each phase comprises:
determining if a number of instructions in a most representative interval within the set of intervals is equal to the phase instruction budget; and
responsive to the instructions within the most representative interval being equal to the phase instruction budget, identifying a beginning of the most representative interval as the starting index and an end of the most representative interval as the ending index.

4. The method of claim 1, wherein identifying the starting index and the ending index for instructions within the set of intervals in each phase comprises:
determining if a number of instructions in a most representative interval within the set of intervals is more than the phase instruction budget; and
responsive to the instructions within the most representative interval being more than the phase instruction budget, identifying a beginning of the most representative interval as the starting index and scaling the most representative interval to a point where the number of instructions equals the phase instruction budget, wherein the point is the ending index.

5. The method of claim 1, wherein identifying the starting index and the ending index for instructions within the set of intervals in each phase comprises:
determining if a number of instructions in more than one most representative intervals within the set of intervals is equal to the phase instruction budget; and
responsive to the instructions within the more than one most representative intervals being equal to the phase instruction budget, identifying a beginning of the more than one most representative intervals as the starting index and an end of the more than one most representative intervals as the ending index.

6. The method of claim 1, wherein identifying the starting index and the ending index for instructions within the set of intervals in each phase comprises:
determining if a number of instructions in more than one most representative intervals within the set of intervals is more than the phase instruction budget; and
responsive to the instructions within the more than one most representative intervals being more than the phase instruction budget, identifying a beginning of the more than one most representative intervals as the starting index and scaling the more than one most representative intervals to a point where the number of instructions equals the phase instruction budget, wherein the point is the ending index.

7. The method of claim 1, further comprising:
responsive to the global instruction budget failing to be met, determining if the sum of the instructions within the set of interval indices is less than the global instruction budget; and
responsive to the sum of the instructions within the set of interval indices being less than the global instruction budget, increasing the instructions within one interval of one phase in the set of phases in order to meet the instruction budget.

8. The method of claim 1, further comprising:
responsive to the global instruction budget failing to be met, determining if the sum of the instructions within the set of interval indices is more than the global instruction budget; and
responsive to the sum of the instructions within the set of interval indices being more than the global instruction budget, decreasing the instructions within one interval of one phase in the set of phases in order to meet the instruction budget.

9. A computer program product comprising a computer useable storage medium having a computer readable program stored thereon, wherein the computer readable program, when executed in a data processing system, causes the data processing system to:
calculate a phase instruction budget for each phase in a set of phases of a plurality of instructions, each phase comprising a subset of instructions from the plurality of instructions, wherein:
the phase instruction budget is based on a weight associated with each phase and a global instruction budget,
the global instruction budget specifies a maximum number of instructions to be used to trace execution of the plurality of instructions, and
the phase instruction budget for an associated phase specifies a maximum number of instructions to be used to trace execution of a subset of instructions associated with the associated phase, and the weight associated with each phase is a proportion of instructions from full program execution that are attributed to the phase;

identify a starting index and an ending index for instructions within a set of intervals in each phase in order to meet the phase instruction budget for that phase, thereby forming a set of interval indices;

determine if the instructions within the set of interval indices meet the global instruction budget; and responsive to the global instruction budget being met, output the set of interval indices as collection points for the representative traces.

10. The computer program product of claim 9, wherein the computer readable program further causes the data processing system to:

determine if a set of warm-up instructions are to be included with the instructions in the global instruction budget; and responsive to the indication that warm-up instructions are to be included, adjust one of the starting index, or end of a prior interval in the set of intervals, by a predetermined number of instructions.

11. The computer program product of claim 9, wherein the computer readable program to identify the starting index and the ending index for instructions within the set of intervals in each phase further causes the data processing system to:

determine if a number of instructions in a most representative interval within the set of intervals are equal to the phase instruction budget;

responsive to the instructions within the most representative interval being equal to the phase instruction budget, identify a beginning of the most representative interval as the starting index and an end of the most representative interval as the ending index;

determine if the number of instructions in the most representative interval within the set of intervals is more than the phase instruction budget;

responsive to the instructions within the most representative interval being more than the phase instruction budget, identify the beginning of the most representative interval as the starting index and scaling the most representative interval to a point where the number of instructions equals the phase instruction budget, wherein the point is the ending index;

determine if the number of instructions in more than one most representative intervals within the set of intervals is equal to the phase instruction budget; and responsive to the instructions within the more than one most representative intervals being equal to the phase instruction budget, identify the beginning of the more than one most representative intervals as the starting index and an end of the more than one most representative intervals as the ending index.

12. The computer program product of claim 9, wherein the computer readable program to identify the starting index and the ending index for instructions within the set of intervals in each phase further causes the data processing system to:

determine if a number of instructions in more than one most representative intervals within the set of intervals is more than the phase instruction budget; and responsive to the instructions within the more than one most representative intervals being more than the phase instruction budget, identify a beginning of the more than one most representative intervals as the starting index and scaling the more than one most representative intervals to a point where the number of instructions equals the phase instruction budget, wherein the point is the ending index.

13. The computer program product of claim 9, wherein the computer readable program further causes the data processing system to:

responsive to the global instruction budget failing to be met, determine if the sum of the instructions within the set of interval indices is less than the global instruction budget; and responsive to the sum of the instructions within the set of interval indices being less than the global instruction budget, increase the instructions within one interval of one phase in the set of phases in order to meet the instruction budget.

14. The computer program product of claim 9, wherein the computer readable program further causes the data processing system to:

responsive to the global instruction budget failing to be met, determine if the sum of the instructions within the set of interval indices is more than the global instruction budget; and responsive to the sum of the instructions within the set of interval indices being more than the global instruction budget, decrease the instructions within one interval of one phase in the set of phases in order to meet the instruction budget.

15. A system, comprising:

a processor; and a memory coupled to the processor, wherein the memory comprises instructions which, when executed by the processor, cause the processor to:

calculate a phase instruction budget for each phase in a set of phases of a plurality of instructions, each phase comprising a subset of instructions from the plurality of instructions, wherein:

the phase instruction budget is based on a weight associated with each phase and a global instruction budget, the global instruction budget specifies a maximum number of instructions to be used to trace execution of the plurality of instructions, and the phase instruction budget for an associated phase specifies a maximum number of instructions to be used to trace execution of a subset of instructions associated with the associated phase, and the weight associated with each phase is a proportion of instructions from full program execution that are attributed to the phase;

identify a starting index and an ending index for instructions within a set of intervals in each phase in order to meet the phase instruction budget for that phase, thereby forming a set of interval indices;

determine if the instructions within the set of interval indices meet the global instruction budget; and responsive to the global instruction budget being met, output the set of interval indices as collection points for the representative traces.

16. The system of claim 15, wherein the instructions further cause the processor to:

determine if a set of warm-up instructions are to be included with the instructions in the global instruction budget; and responsive to the indication that warm-up instructions are to be included, adjust one of the starting index, or end of a prior interval in the set of intervals, by a predetermined number of instructions.

17. The system of claim 15, wherein the instructions to identify the starting index and the ending index for instructions within the set of intervals in each phase further cause the processor to:
- determine if a number of instructions in a most representative interval within the set of intervals are equal to the phase instruction budget;
- responsive to the instructions within the most representative interval being equal to the phase instruction budget, identify a beginning of the most representative interval as the starting index and an end of the most representative interval as the ending index;
- determine if the number of instructions in the most representative interval within the set of intervals is more than the phase instruction budget;
- responsive to the instructions within the most representative interval being more than the phase instruction budget, identify the beginning of the most representative interval as the starting index and scaling the most representative interval to a point where the number of instructions equals the phase instruction budget, wherein the point is the ending index;
- determine if the number of instructions in more than one most representative intervals within the set of intervals is equal to the phase instruction budget; and
- responsive to the instructions within the more than one most representative intervals being equal to the phase instruction budget, identify the beginning of the more than one most representative intervals as the starting index and an end of the more than one most representative intervals as the ending index.

18. The system of claim 15, wherein the instructions to identifying the starting index and the ending index for instructions within the set of intervals in each phase further cause the processor to:
- determine if a number of instructions in more than one most representative intervals within the set of intervals is more than the phase instruction budget; and
- responsive to the instructions within the more than one most representative intervals being more than the phase instruction budget, identify a beginning of the more than one most representative intervals as the starting index and scaling the more than one most representative intervals to a point where the number of instructions equals the phase instruction budget, wherein the point is the ending index.

19. The system of claim 15, wherein the instructions further cause the processor to:
- responsive to the global instruction budget failing to be met, determine if the sum of the instructions within the set of interval indices is less than the global instruction budget; and
- responsive to the sum of the instructions within the set of interval indices being less than the global instruction budget, increase the instructions within one interval of one phase in the set of phases in order to meet the instruction budget.

20. The system of claim 15, wherein the instructions further cause the processor to:
- responsive to the global instruction budget failing to be met, determine if the sum of the instructions within the set of interval indices is more than the global instruction budget; and
- responsive to the sum of the instructions within the set of interval indices being more than the global instruction budget, decrease the instructions within one interval of one phase in the set of phases in order to meet the instruction budget.

* * * * *